US011480087B2

(12) United States Patent
von Meduna et al.

(10) Patent No.: US 11,480,087 B2
(45) Date of Patent: Oct. 25, 2022

(54) MIXER APPARATUS FOR AN EXHAUST GAS AFTERTREATMENT SYSTEM OF A MOTOR VEHICLE, EXHAUST GAS AFTERTREATMENT SYSTEM, AND MOTOR VEHICLE

(71) Applicant: Robert Bosch GmbH, Stuttgart (DE)

(72) Inventors: Dirk von Meduna, Stuttgart (DE); Guangtuo Yang, Wuxi (CN); Dirk Heilig, Ilsfeld (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/600,386

(22) PCT Filed: Mar. 11, 2020

(86) PCT No.: PCT/EP2020/056413
§ 371 (c)(1),
(2) Date: Sep. 30, 2021

(87) PCT Pub. No.: WO2020/216520
PCT Pub. Date: Oct. 29, 2020

(65) Prior Publication Data
US 2022/0178294 A1 Jun. 9, 2022

(30) Foreign Application Priority Data
Apr. 25, 2019 (DE) .................. 102019205883.3

(51) Int. Cl.
*F01N 3/24* (2006.01)
*F01N 3/28* (2006.01)
(Continued)

(52) U.S. Cl.
CPC ....... *F01N 3/2892* (2013.01); *B01D 53/9418* (2013.01); *B01F 25/3131* (2022.01); *F01N 3/2066* (2013.01); *F01N 2610/1453* (2013.01)

(58) Field of Classification Search
CPC .............. F01N 3/2892; F01N 2240/20; F01N 2610/1453
See application file for complete search history.

(56) References Cited

U.S. PATENT DOCUMENTS

| 2012/0144812 A1 | 6/2012 | Hyun |
| 2015/0240692 A1 | 8/2015 | De Rudder |

(Continued)

FOREIGN PATENT DOCUMENTS

| DE | 102013005206 B3 | 6/2014 |
| DE | 102016211703 A1 | 1/2018 |

(Continued)

OTHER PUBLICATIONS

International Search Report for PCT/EP2020/056413, dated Jun. 15, 2020.

*Primary Examiner* — Jonathan R Matthias
(74) *Attorney, Agent, or Firm* — Norton Rose Fulbright US LLP; Gerard Messina

(57) ABSTRACT

A mixer apparatus for an exhaust gas aftertreatment system of a motor vehicle. The apparatus includes a housing having enveloping, first end, and second end walls. An injection opening for an exhaust gas aftertreatment agent is in the enveloping wall. An inlet opening is in the first end wall. The injection opening is configured for mounting a metering module. A rectilinear metering axis, which extends through the metering module and corresponds to an injection direction of exhaust gas aftertreatment agent injected into the housing, tangentially contacts, at a contact point, a theoretical cylinder, disposed in the housing, having a variable radius and a cylinder axis that is congruent with a central axis of the housing. A region of the metering axis extending from the injection opening to the contact point is located, (Continued)

with respect to inflowing exhaust gas, in the shelter of an opening-free region of the first end wall.

13 Claims, 2 Drawing Sheets

(51) Int. Cl.
*B01F 25/313* (2022.01)
*B01D 53/94* (2006.01)
*F01N 3/20* (2006.01)

(56) References Cited

U.S. PATENT DOCUMENTS

| | | | |
|---|---|---|---|
| 2015/0273411 A1* | 10/2015 | Chapman | F01N 13/009 |
| | | | 60/301 |
| 2020/0173330 A1* | 6/2020 | Tucker | B01F 25/3141 |
| 2020/0271035 A1* | 8/2020 | Gattani | B01F 23/2132 |

FOREIGN PATENT DOCUMENTS

| | | |
|---|---|---|
| DE | 102018115689 A1 | 8/2018 |
| WO | 2014051617 A1 | 4/2014 |

* cited by examiner

MIXER APPARATUS FOR AN EXHAUST GAS AFTERTREATMENT SYSTEM OF A MOTOR VEHICLE, EXHAUST GAS AFTERTREATMENT SYSTEM, AND MOTOR VEHICLE

The present invention relates to a mixer apparatus for an exhaust gas aftertreatment system of a motor vehicle, which apparatus has a, for example, cylindrical housing having an enveloping wall, a first end wall, and a second end wall; an injection opening for an exhaust gas aftertreatment agent being embodied in the enveloping wall; and at least one flow-directing element extending in curved fashion, which directs an exhaust gas flow from at least one inlet opening to an outlet opening embodied in the second end wall, being disposed in the housing.

The present invention further relates to an exhaust gas aftertreatment system having such a mixer apparatus, and to a motor vehicle having a corresponding exhaust gas aftertreatment system.

BACKGROUND INFORMATION

A variety of methods and apparatuses that serve to reduce hazardous constituents of an exhaust gas are available for the aftertreatment of exhaust gases, in particular of diesel engines. One method often used is "selective catalytic reduction" (SCR) for reducing nitrogen oxide constituents in the exhaust gas. Here an aqueous urea solution, constituting an exhaust gas aftertreatment agent, is injected into the exhaust gas flow, mixes with the exhaust gas, and reacts downstream in a catalyst, together with the exhaust gas, in order to reduce nitrogen oxides. The result of the exhaust gas aftertreatment can be optimized by improved blending of the exhaust gas aftertreatment agent and the exhaust gas. It is conventional, for example, to provide, for mixing, a mixer apparatus such as the one described, for example, in German Patent Application No. DE 10 2013 005 206 B3. This mixer apparatus has in the housing a helically extending flow-directing element, the result of which is that the exhaust gas flow acquires a swirl and that a mixing section of the greatest possible length is made available in only a small space. The flow-directing element guides the exhaust gas flow from the inlet opening to an outlet opening in the second end wall, where the mixture of exhaust gas flow and exhaust gas aftertreatment agent emerges from the mixing apparatus and is delivered to the SCR catalyst. Because exhaust gas regulations are constantly becoming more stringent, great effort is being expended on improving fuel efficiency and at the same time reducing emissions, in particular the nitrogen oxide portion, in exhaust gas. One of the consequences of this is that the temperature of the exhaust gas flow decreases. This has the disadvantage, for the SCR catalyst, that it is more difficult to reach the reaction temperature necessary for reduction of the nitrogen oxide constituents. Normally the SCR catalyst is disposed far away from the internal combustion engine, with the result that further temperature losses occur. The closer to the internal combustion engine the catalyst is located, or the shorter the distance the exhaust gas flow must travel from the internal combustion engine to the catalyst, the better the aftertreatment result for many operating states.

German Patent Application No. DE 10 2016 211 703 A1, the disclosure of which is expressly incorporated into the description of the present invention by reference, discloses a mixer apparatus for an exhaust gas aftertreatment system of a motor vehicle, which apparatus has a cylindrical housing having an enveloping wall, a first end wall, and a second end wall; an injection opening for an exhaust gas aftertreatment agent being embodied in the enveloping wall. The exhaust gas flows from at least one inlet opening in a first end wall to an outlet opening in a second end wall, the at least one inlet opening allowing much of the incoming flow of exhaust gas to flow into the mixer apparatus.

SUMMARY

A mixer apparatus according to an example embodiment of the present invention may have the advantage that even further improved mixing of the exhaust gas and exhaust gas aftertreatment agent occurs in a small space, the mixer apparatus and the downstream catalyst being capable of being disposed close to the internal combustion engine but nevertheless ensuring a sufficient mixing path for sufficient mixing. Provision is made here, particularly advantageously, that at least a substantial region of the metering axis proceeding from the injection opening is located, with respect to inflowing exhaust gas, in the shelter of an opening-free region of the first end wall, so that a stream of reducing agent can propagate in protected fashion and can nevertheless become intimately mixed with exhaust gas in a very small space. Suitable provision of opening-free regions can at the same time enable improved (especially in thermomechanical terms) fastening of flow-directing elements on the first end wall that is located close to or in the region of an inlet opening.

Further advantages and preferred features and feature combinations are evident in particular from the disclosure herein.

The present invention will be discussed below in further detail with reference to the figures.

DETAILED DESCRIPTION OF EXAMPLE EMBODIMENTS

Figure 1:
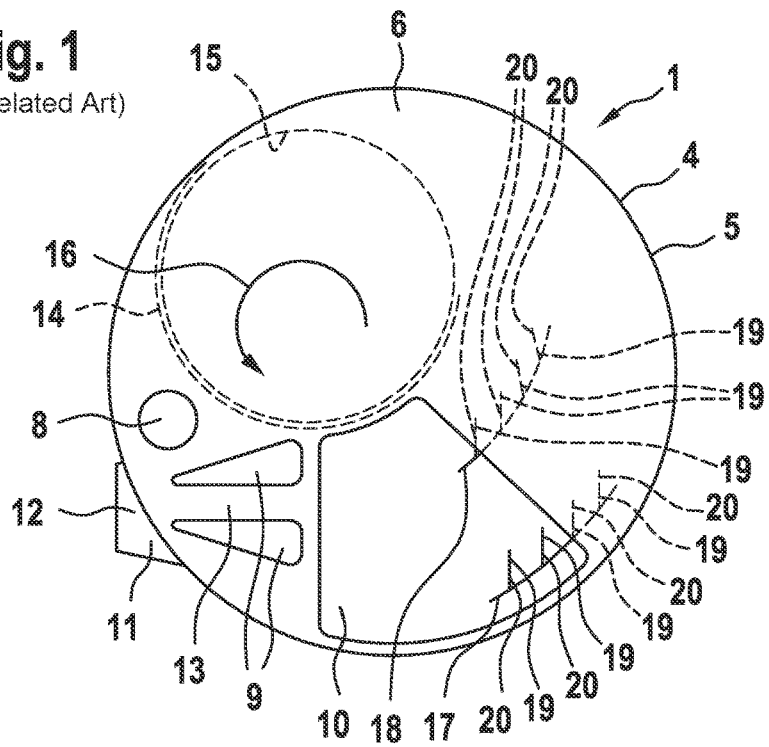
FIG. 1 is a plan view of a mixer apparatus, from the related art, for an exhaust gas aftertreatment system of a motor vehicle.

FIG. 1 is a simplified plan view of a mixer apparatus 1 for an exhaust gas aftertreatment system (not depicted here in further detail) of a motor vehicle. Mixer apparatus 1 can be disposed in terms of flow downstream from an internal combustion engine, in particular between an oxidation catalyst and an SCR catalyst or an SCR-coated particle filter, and serves to optimally mix an exhaust gas aftertreatment agent with the exhaust gas flow of the internal combustion engine so that an advantageous reduction of nitrogen oxides can occur in the SCR catalyst located downstream.

Figure 2:
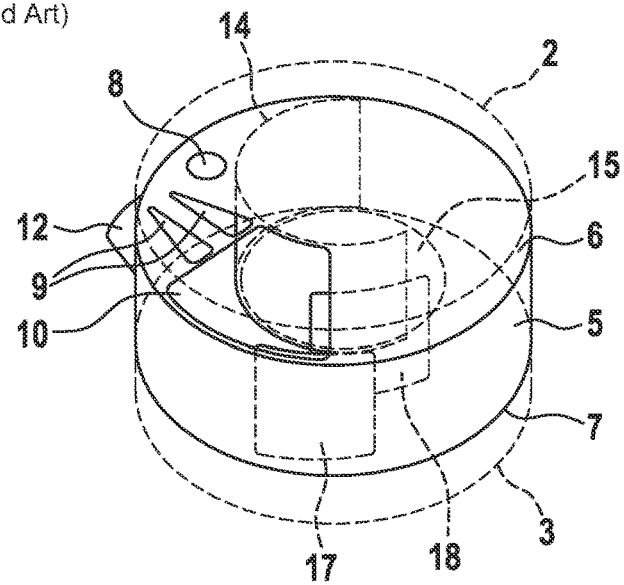
FIG. 2 is a perspective depiction of the mixer apparatus from the related art.

FIG. 2 is a perspective depiction of mixer apparatus 1, in which oxidation catalyst 2 located upstream, and SCR catalyst 3 or the SCR-coated particle filter located downstream, are indicated with dashed lines.

Mixer apparatus 1 has a housing 4 that has an enveloping wall 5 (extending circularly in the present exemplifying embodiment) as well as a first end wall 6 and a second end wall 7. End walls 6 and 7 are aligned parallel to one another and disposed with a spacing from one another, the enveloping wall preferably projecting beyond the end walls. Housing 4 is thus embodied in a cylindrical shape.

First end wall 6 has several inlet openings 8, 9, and 10. Inlet opening 8 is optionally circular; inlet openings 9 are wedge-shaped, and inlet opening 10 is embodied in the shape of a circular segment. The disposition and configuration of inlet openings 8, 9, and 10 will be discussed in further detail below.

Enveloping wall 5 has an injection opening 11 for liquid exhaust gas aftertreatment agent, injection opening 11 being embodied at the end of an injection fitting 12. Injection fitting 12 serves, for example, to receive an injection valve or metering module so that by way of the injection valve or metering module, the exhaust gas aftertreatment agent is injected in metered fashion directly at mixer apparatus 1. Fitting 12 is oriented in such a way that the liquid exhaust gas aftertreatment agent is injected into housing 4 in the direction of a secant.

First inlet opening 8 is located slightly upstream from injection opening 11; inlet openings 9 begin approximately at the level of injection opening 11 and extend substantially parallel to the injection direction, and their inside width widens so as thereby to produce the wedge shape already mentioned earlier. The two inlet openings 9 are disposed in mirror-image fashion with respect to one another, so that a portion 13 that is embodied with no opening lies between them. This portion 13 extends from injection opening 11 as far as inlet opening 10 in end wall 6. Portion 13 ensures that the exhaust gas flow does not directly perpendicularly encounter the injected exhaust gas aftertreatment agent in this region, with the result that the exhaust gas flow would force the injected-agent flow away or that the injected-agent flow would be deflected against end wall 7 of housing 4.

Also disposed in housing 4 is a flow-directing element 14 that extends in a semicircular or spiral shape and eccentrically in housing 4, so that the exhaust gas flow and the injected aftertreatment agent are guided to an outlet opening 15 embodied eccentrically in end wall 7. The flow path in housing 4 is lengthened by the flow-directing element. Flow-directing element 14 extends in a semicircular or spiral shape along the outer contour of the circular outlet opening 15. Flow-directing element 14 begins at enveloping wall 5, thereby producing the semicircular or spiral profile. The exhaust gas aftertreatment agent and the exhaust gas flow firstly strike the outer side of flow-directing element 14 and are then delivered by enveloping wall 5 to the inner side of flow-directing element 14, which delivers the flow to outlet opening 15. A swirl is thereby produced in the mixture of exhaust gas and exhaust gas aftertreatment agent, as indicated by an arrow 16.

Disposed parallel to flow-directing element 14 are, in the present case, two further flow-directing elements 17 and 18 that are embodied to be shorter than flow-directing element 14 and extend along a circumferential line whose radius has the same origin as the radius of flow-directing element 14.

Further flow-directing elements 17, 18 each have several laterally projecting impact elements 19. Impact elements 19 each form an impact surface 20 that faces toward injection opening 11. Impact elements 19 are oriented in such a way that impact surfaces 20 lie substantially perpendicular to the injection direction of the exhaust gas aftertreatment agent. In the present case, impact elements 19 are embodied as impact tabs that are bent out of further flow-directing elements 17, 18. Further flow-directing elements 17, 18 are thus embodied in one piece with the respective impact elements 19. Further flow-directing elements 17, 18 can be produced, for example, as bent stamped sheet parts.

Further flow-directing elements 17, 18 are disposed locally at the level of inlet opening 10, so that exhaust gas flowing in through inlet opening 10 can directly strike flow-directing elements 17, 18.

During operation, the exhaust gas flow is thus introduced through inlet openings 8, 9, and 10 into housing 4, while the exhaust gas aftertreatment agent is injected through injection opening 11 into housing 4. Because of portion 13, the injected exhaust gas aftertreatment agent travels onto impact surfaces 20, where it atomizes and advantageously becomes mixed with the exhaust gas flow that is also flowing in. As a result of flow-directing element 14 and the extent of flow-directing elements 17, 18, the mixture of exhaust gas flow and exhaust gas aftertreatment agent is delivered along enveloping wall 5 and flow-directing element 14 of outlet opening 15, thereby producing swirl 16. Swirl 16 results in a blending of the exhaust gas aftertreatment agent with the exhaust gas, and in a uniform impingement of the exhaust gas aftertreatment agent on the SCR catalyst, or SCR-coated particle filter, located downstream, thus producing advantageous exhaust gas aftertreatment.

Mixer apparatus 1 has the advantage of a space-saving configuration with a long flow path, which permits advantageous mixing. In addition, advantageous atomization of the exhaust gas aftertreatment agent is ensured. The placement of one or several sensors on the mixer apparatus, in particular upstream from the mixing region, for the purpose of monitoring exhaust gas aftertreatment is of course possible. The injection valve can be disposed in simple and economical fashion on housing 4 or on mixer apparatus 1. Mixer apparatus 1 permits good utilization of the thermal energy of the exhaust gas flow against the impact surfaces or against further flow-directing elements 17, 18, thereby improving the robustness of the mixer apparatus with respect to the exhaust gas aftertreatment agent.

Figure 3:
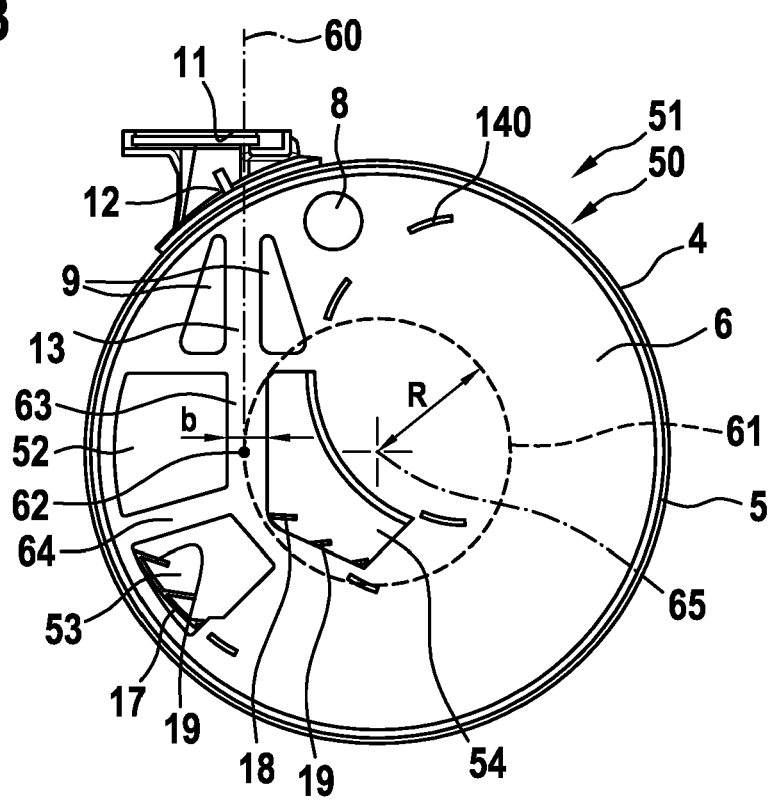
FIG. 3 is a plan view of a mixer apparatus for an exhaust gas aftertreatment system of a motor vehicle, in accordance with an example embodiment of the present invention.

FIG. 3 shows a mixer apparatus 50 having an alternative configuration of the mixing section, resulting from an alternative configuration of first end wall 6. This is a compact reducing-agent mixing section having an improved exhaust gas entry region. Like the assemblage shown in FIGS. 1 and 2, the mixer apparatus encompasses a region in the exhaust gas section which is cylindrical (or alternatively is an oval region) and whose length is delimited by an entry plane and an exit plane in the form of an entry panel and exit panel (end walls 6 and 7). With the configuration of the entry panel (first end wall 6) in accordance with the assemblage of FIGS. 1 and 2, a main opening for the main exhaust gas flow is implemented. In order to improve back pressure behavior, in the assemblage shown in FIGS. 1 and 2 further smaller openings, so-called bypass openings or secondary openings (inlet openings 8 and 9), are also optionally present. The consequence of the configuration having one main opening, in accordance with FIGS. 1 and 2, is that the exhaust gas flow in the interior of the mixer apparatus can undesirably influence spray propagation, in particular in the region of the surfaces interacting with the spray, namely the region of the reducing-agent spray/wall interaction. A negative influence can occur in particular during dynamic engine operation due to the typical and very large variation in exhaust gas flow conditions (including pressure, temperature, exhaust gas mass flow). This can have negative effects on mixing and vaporization, including undesired deposition of additives in the exhaust system.

Figure 4:
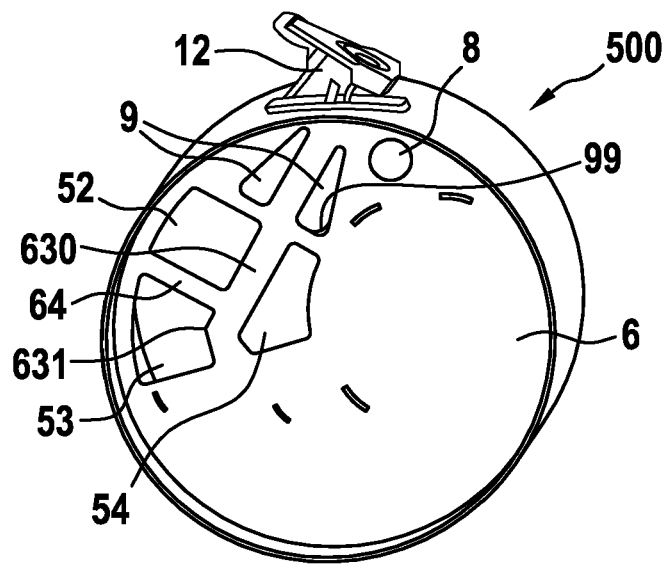
FIG. 4 is a perspective depiction of a further mixer apparatus for an exhaust gas aftertreatment system of a motor vehicle, in accordance with an example embodiment of the present invention.

The alternative configuration in accordance with FIGS. 3 and 4 shows a modification of the inlet region which results in a decrease in the influence of variations in exhaust gas flow conditions which are typically present, and thus in improved and even more robust operation of the mixing section. Constituents that are identical or similar to ones in FIGS. 1 and 2 are labeled with the same reference characters and are not described again.

FIG. 3 shows a plan view 51 of first end wall 6 of a mixer apparatus 50 from outside. Inlet openings 8 and 9, which have already been described and are located close to the injection fitting, are so-called secondary openings; they serve primarily for back pressure compensation by furnishing a bypass with respect to the orientation, predefined by injection direction 60, of the mixing section. Injection direction 60 corresponds to a notional metering axis through a metering module or metering valve (not depicted in further detail) that is mounted on injection fitting 12 and injects through injection opening 11. Inlet openings 52, 53, and 54, which are also referred to as "main openings" and are preferably located close to a desired spray/enveloping wall contact between the reducing agent and the mixer wall, are located in the region of the injection direction but not directly adjacently to the region of injection fitting 12, i.e. remotely from the injector outlet or metering valve outlet. In contrast to the assemblage shown in FIGS. 1 and 2, the assemblage as shown in FIG. 3 therefore has a plurality of main openings. These main openings are disposed in first end wall 6 in such a way that, in the plan view that is depicted, they lie next to the metering axis, i.e. surround the metering axis; in other words, end wall 6 has regions that screen that metering axis, at least (proceeding from the injection fitting) as far as the tangential contact point 62 of the metering axis with a notional (i.e., theoretical) cylinder 61 that has a radius R measured from central axis 65 of the mixer apparatus or of the housing, which extends perpendicularly to the drawing plane. In the exemplifying embodiment depicted, the provision of main openings 52 and 54 disposed on both sides of the metering axis or of the injection direction thereby results in a so-called flow stabilization web 63 as a constituent of end wall 6, which, like end wall 7 disposed downstream, is embodied as a two-dimensionally shaped, i.e. flat, panel. Beneath the flow stabilization web having a width b, the introduced reducing agent can propagate in protected fashion, i.e. in the shelter of the end wall or of its flow stabilization web. Further main opening 53, because of its adjacency to main opening 52, results in a transverse web 64 that mechanically stabilizes flow stabilization web 63. Also visible in FIG. 3 are fastening regions 140 of flow-directing element 14 that has already been described in conjunction with FIGS. 1 and 2.

In the example depicted in FIG. 3, an inlet opening that occupies 60 percent or more of the total available cross-sectional area of end wall 6 is not provided in end wall 6. An inlet opening that occupies 50 percent or more of the total available cross-sectional area of end wall 6 is preferably not provided in the first end wall. An assemblage having three main openings is depicted. It is also possible, however, for only two main openings to be provided, which are separated from one another at the level of the metering axis by a flow stabilization web of the end wall.

Alternatively, it is also possible to provide, as a single main opening or as one of several main openings, a main opening that encompasses at least 50 percent or even more than 60 percent of the available cross-sectional area, i.e. the area over which the exhaust gas can flow into the mixer apparatus. In any case, conversely, it is ensured that the injection direction is screened in the region of the injection fitting by first end wall 6 preferably as far as the notional contact point 62 with the above-described theoretical cylinder. The injection direction can also be screened by the end wall even farther than that, in particular continuously as far as enveloping wall 5 located oppositely from the injection fitting.

Even when only one main opening is provided, the injection direction or metering axis 60 is intended to be screened by end wall 6. It is preferable to provide in this context a main opening that is close to the enveloping wall and is located between the enveloping wall and the metering axis, the metering axis preferably extending close to that single main opening, in particular parallel to an edge of that single main opening which is close to the central axis of the mixer apparatus, but is screened by end wall 6.

The configuration in accordance with FIG. 3, or the alternatives mentioned, ensure that the stream of reducing agent is influenced ("blown away") as little as possible by the exhaust gas flow, and that the stream arrives accurately at the propagation regions desired for optimum operation.

Further flow-directing elements 17, 18 are disposed locally at the level of main openings 52, 53, and 54 (in particular 53 and 54), so that exhaust gas flowing in, especially through inlet openings 53 and 54, can directly strike flow-directing elements 17, 18.

Further alternatives to the assemblage as shown in FIG. 3 involve omitting opening 9 depicted on the right in FIG. 3 and/or omitting main opening 54. Alternatively, main openings 52 and/or 53 can also be omitted. In particular, the right-hand secondary opening 9 can also be made slightly smaller, in particular reduced by half, the part oriented toward the center of the mixer apparatus preferably being omitted, for example in such a way that a reduced-size right-hand opening 9 is located no closer to the center than opening 8 and/or left opening 9 whose size has been maintained.

A maximally symmetrical provision of openings to the right and left of the spray axis or metering axis or injection direction is, on the other hand, preferred. A portion 13 or flow stabilization web 63 which is formed can vary in width along its extent from the injection fitting to its end remote from the injection fitting, for example generally in accordance with a widening spray cone in order to furnish optimum shelter for the spray cone, or, if the exhaust gas back pressure is to be minimized, a decrease in the width of the flow stabilization web toward its end remote from the injection fitting.

FIG. 4 shows part of a further alternative mixer apparatus 500, as a perspective view 501 of (only) first end wall 6. This mixer apparatus, like the assemblage according to FIG. 3, has three main openings and three secondary openings, but the geometries of the openings are slightly modified. The right-hand opening 9, for example, has on the side facing toward the center of the mixer apparatus a curve 99 that makes right-hand opening 9 smaller. The alternative flow stabilization web 630 furthermore has a corner region 631 projecting into main opening 53.

As a further variant, the first end wall can be shaped in such a way that with respect to inflowing exhaust gas, the metering axis is located along its entire extent through the mixer apparatus (i.e. not only as far as contact point 62) in the shelter of an opening-free region of the first end wall.

As a further variant, the first end wall can be shaped in such a way that in addition to the feature of locating at least one region, extending from the injection opening to contact point 62, of the metering axis in the shelter of an opening-free region of the first end wall, the entire theoretical cylinder, at least the theoretical cylinder downstream from contact point 62, lies in the shelter of an opening-free region of the first end wall; in other words, the theoretical cylinder or the relevant portion of the theoretical cylinder, viewed from the inlet side of the mixer apparatus, is covered by an opening-free region or regions of the first end wall.

In the case of a cylindrical mixer apparatus, its diameter is typically five to 15 inches.

In the case in which a flow stabilization web is provided, it has a width b of one to two centimeters transversely to metering axis 60.

The magnitude of radius R of the theoretical cylinder is preferably such that the metering axis touches the theoretical cylinder approximately halfway between the enveloping wall and the central axis of the mixer apparatus. Radius R can be equal to 0.25 times to 0.65 times the semi-diameter of the mixer apparatus. A value range between 0.4 times and 0.5 times the semi-diameter of the mixer apparatus is particularly preferred here.

A preferred ratio R/b between the radius of the theoretical cylinder and width b of a flow stabilization web is in a value range between 0.55 and 9, particularly preferably in a value range between 0.9 and 4.5.

What is claimed is:

1. A mixer apparatus for an exhaust gas aftertreatment system of a motor vehicle, comprising:
    a housing having an enveloping wall, a first end wall, and a second end wall;
    an injection opening for an exhaust gas aftertreatment agent is embodied in the enveloping wall; and
    at least one flow-directing element extending in curved fashion, which directs an exhaust gas flow from at least one inlet opening to an outlet opening embodied in the second end wall, is disposed in the housing, the at least one inlet opening being embodied in the first end wall, the injection opening being configured for mounting of a metering module;
    wherein a rectilinear metering axis, which extends notionally through the metering module and which corresponds to an injection direction of the exhaust gas aftertreatment agent injected into the housing, tangentially contacts, at a contact point, a theoretical cylinder, disposed in the housing, having a variable radius and having a cylinder axis that is congruent with a central axis of the housing, and wherein at least a region of the metering axis extending from the injection opening to the contact point is located, with respect to inflowing exhaust gas, in the shelter of an opening-free region of the first end wall,
    wherein an entirety of theoretical cylinder downstream from the contact point lies in the shelter of the opening-free region of the first end wall.

2. The mixer apparatus as recited in claim 1, wherein the metering module includes a metering valve.

3. The mixer apparatus as recited in claim 1, wherein the first end wall has at least two inlet openings separated from one another by a flow stabilization web.

4. The mixer apparatus as recited in claim 3, wherein the variable radius is defined in accordance with a width of the flow stabilization web, in such a way that the contact point lies in the shelter of the flow stabilization web.

5. The mixer apparatus as recited in claim 4, wherein a ratio of the variable radius to a width of the flow stabilization web has a value of between 0.55 and 9.

6. The mixer apparatus as recited in claim 5, wherein the ratio of the variable radius to the width of the flow stabilization web has a value of between 0.9 and 4.5.

7. The mixer apparatus as recited in claim 1, wherein the outlet opening is disposed eccentrically in the second end wall.

8. The mixer apparatus as recited in claim 1, wherein the housing is shaped in cylindrical or oval or elliptical fashion.

9. The mixer apparatus as recited in claim 1, wherein the first and second end walls are each located in one plane, and are configured two-dimensionally.

10. The mixer apparatus as recited in claim 1, wherein the first and second end walls are disposed parallel to one another.

11. An exhaust gas aftertreatment system for a motor vehicle, comprising:
    at least one mixer apparatus, for an exhaust gas flow of an internal combustion engine, a liquid exhaust gas aftertreatment agent being deliverable via the mixer apparatus to the exhaust gas flow, the mixer apparatus including:
        a housing having an enveloping wall, a first end wall, and a second end wall;
        an injection opening for an exhaust gas aftertreatment agent is embodied in the enveloping wall; and
        at least one flow-directing element extending in curved fashion, which directs the exhaust gas flow from at least one inlet opening to an outlet opening embodied in the second end wall, is disposed in the housing, the at least one inlet opening being embodied in the first end wall, the injection opening being configured for mounting of a metering module;
        wherein a rectilinear metering axis, which extends notionally through the metering module and which corresponds to an injection direction of the exhaust gas aftertreatment agent injected into the housing, tangentially contacts, at a contact point, a theoretical cylinder, disposed in the housing, having a variable radius and having a cylinder axis that is congruent with a central axis of the housing, and
        wherein at least a region of the metering axis extending from the injection opening to the contact point is located, with respect to inflowing exhaust gas, in the shelter of an opening-free region of the first end wall,
        wherein an entirety of theoretical cylinder downstream from the contact point lies in the shelter of the opening-free region of the first end wall.

12. The exhaust gas aftertreatment system as recited in claim 11, wherein a first exhaust gas aftertreatment component including an oxidation catalyst is disposed upstream from the mixer apparatus and upstream from the first end wall, and a second exhaust gas aftertreatment component including a selective catalytic reduction catalyst and/or a selective catalytically coated particle filter, is disposed downstream from the mixer apparatus and downstream from the second end wall.

13. A motor vehicle, comprising:
    an internal combustion engine; and
    an exhaust gas aftertreatment system for the internal combustion engine, the exhaust gas aftertreatment system including at least one mixer apparatus, for an exhaust gas flow of the internal combustion engine, a liquid exhaust gas aftertreatment agent being deliverable via the mixer apparatus to the exhaust gas flow, the mixer apparatus including:

a housing having an enveloping wall, a first end wall, and a second end wall, an injection opening for an exhaust gas aftertreatment agent is embodied in the enveloping wall, and at least one flow-directing element extending in curved fashion, which directs the exhaust gas flow from at least one inlet opening to an outlet opening embodied in the second end wall, is disposed in the housing, the at least one inlet opening being embodied in the first end wall, the injection opening being configured for mounting of a metering module, wherein a rectilinear metering axis, which extends notionally through the metering module and which corresponds to an injection direction of the exhaust gas aftertreatment agent injected into the housing, tangentially contacts, at a contact point, a theoretical cylinder, disposed in the housing, having a variable radius and having a cylinder axis that is congruent with a central axis of the housing, and wherein at least a region of the metering axis extending from the injection opening to the contact point is located, with respect to inflowing exhaust gas, in the shelter of an opening-free region of the first end wall, wherein an entirety of theoretical cylinder downstream from the contact point lies in the shelter of the opening-free region of the first end wall.

* * * * *